No. 865,225. PATENTED SEPT. 3, 1907.
S. E. ARNEY.
SAW FILING AND SETTING MACHINE.
APPLICATION FILED JAN. 26, 1907.
3 SHEETS—SHEET 1.
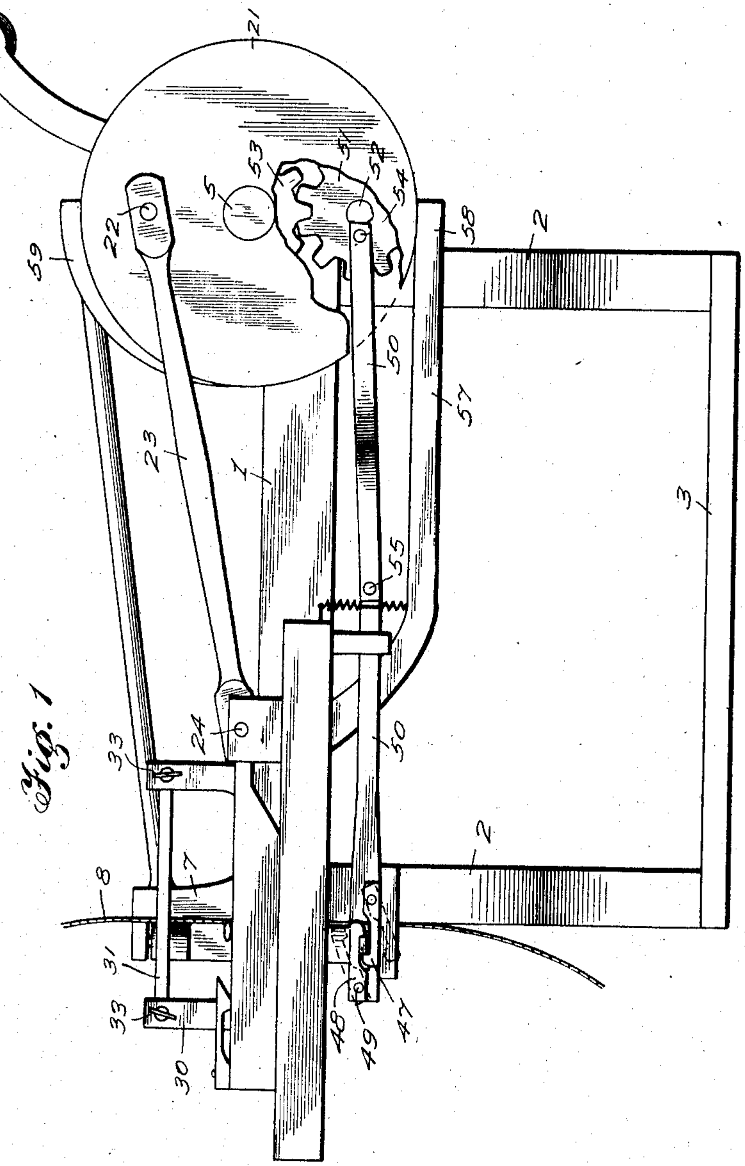
Inventor
Sidney E. Arney
Witnesses
R. C. Claflin
R. M. Smith.
By Victor J. Evans
Attorney
THE NORRIS PETERS CO., WASHINGTON, D. C.

No. 865,225.
PATENTED SEPT. 3, 1907.
S. E. ARNEY.
SAW FILING AND SETTING MACHINE.
APPLICATION FILED JAN. 26, 1907.
3 SHEETS—SHEET 2.
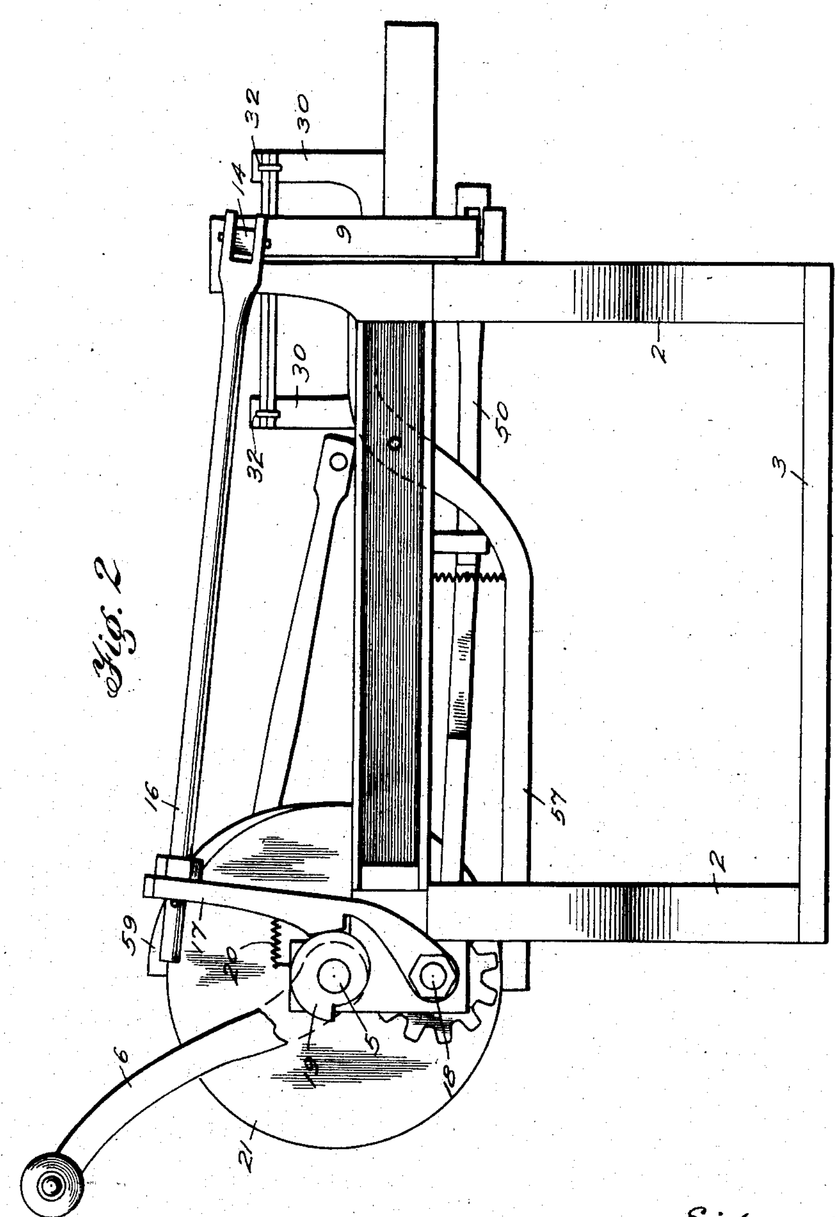
Inventor
Sidney E. Arney
Witnesses
R. C. Claflin
R. M. Smith
By Victor J. Evans
Attorney
THE NORRIS PETERS CO., WASHINGTON, D. C.

No. 865,225.
PATENTED SEPT. 3, 1907.
S. E. ARNEY.
SAW FILING AND SETTING MACHINE.
APPLICATION FILED JAN. 26, 1907.
3 SHEETS—SHEET 3.
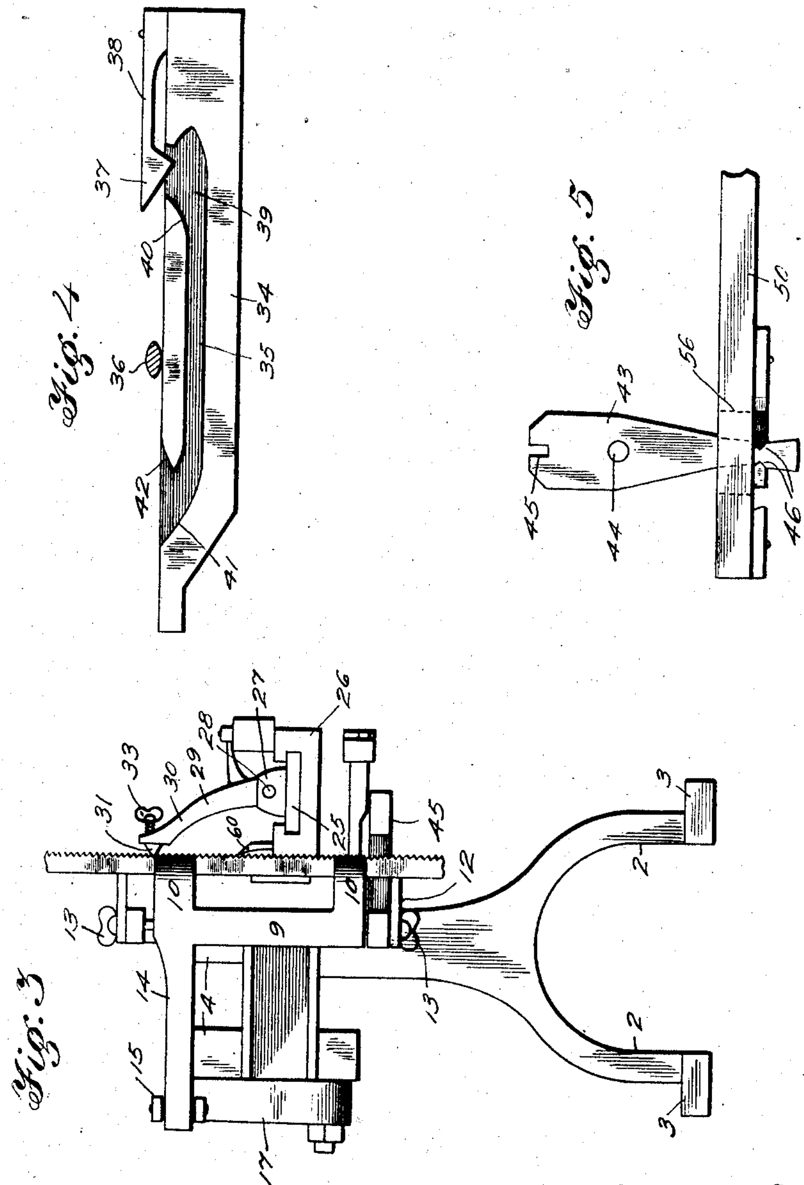
Inventor
Sidney E. Arney
Witnesses
R. C. Claflin.
R. McSmith
By Victor J. Evans
Attorney
THE NORRIS PETERS CO., WASHINGTON, D. C.

UNITED STATES PATENT OFFICE.

SIDNEY E. ARNEY, OF ROSWELL, TERRITORY OF NEW MEXICO.

SAW FILING AND SETTING MACHINE.

No. 865,225. Specification of Letters Patent. Patented Sept. 3, 1907.

Application filed January 26, 1907. Serial No. 354,323.

*To all whom it may concern:*

Be it known that I, SIDNEY E. ARNEY, a citizen of the United States, residing at Roswell, in the county of Chaves and Territory of New Mexico, have invented new and useful Improvements in Saw Filing and Setting Machines, of which the following is a specification.

This invention relates to saw filing and setting machines, the object of the invention being to provide a simple, reliable and portable machine by means of which a saw blade may be quickly and perfectly sharpened and the teeth thereof set without changing the position of the saw-blade by hand or adjusting the tension of the saw-clamp and other parts of the machine, the machine being adapted to be operated either by hand or other power and to automatically feed the saw-blade through the machine by a step by step motion.

A further object of the invention is to provide means for adjusting certain parts of the machine so that said machine will operate upon saws in which the teeth occur at greater or less intervals.

With the above and other objects in view, the invention consists in the novel construction, combination and arrangement of parts hereinafter more fully described, illustrated and claimed.

In the accompanying drawings, Figure 1 is a side elevation of a saw filing and setting machine embodying the present invention. Fig. 2 is a side elevation thereof taken from the opposite side. Fig. 3 is an end view of the machine. Fig. 4 is a detail view of the switch. Fig. 5 is a plan view of the saw set and a portion of the operating mechanism therefor.

The machine in its general construction embodies a bed 1 supported at a suitable elevation by legs 2, 3 designating bottom braces which connect the legs 2 to give additional stiffness to the frame.

At one end, the bed is provided with bearings 4 in which is journaled the main driving shaft 5, one end of which is shown as equipped with a hand operating crank 6 by means of which motion may be imparted to all the mechanism of the machine by hand. It will, of course, be understood, however, that power may be applied to the main driving shaft 5 in any suitable or convenient way.

7 designates the saw rest which is disposed vertically, the saw blade 8 extending vertically through the machine and bearing against the rest 7, as shown in Fig. 1. The saw is held against the rest 7 by means of a clamp 9 which, under the preferred embodiment of this invention, comprises a plurality of saw clamping jaws 10 arranged at any suitable distance apart and connected by the body of the clamp, said jaws being adapted to press the saw-blade 8 against the rest 7 to securely hold the same while being sharpened and set. Adjacent to the top and bottom of the rest 7 there are located saw-blade stops 11 and 12 in the form of slotted plates connected to the rest 7 by means of screws 13 or their equivalent, whereby the stops 11 may be set back or forward to give the desired amount of projection to the teeth of the saw-blade to be properly operated upon by the filing and setting device hereinafter described, the said screws serving as journals for the clamp 9.

The saw-clamp 9 is provided with a lateral extension 14 to which is pivotally connected one end of a connecting rod 16, the opposite end of which connects with a lever 17 fulcrumed at 18 on the machine frame and operated by a cam 19 mounted on the main driving shaft 5, as best illustrated in Fig. 2. Thus, as the shaft 5 revolves, the lever 17 is rocked at the proper moment to release the saw-blade and allow the same to be fed along the distance of a tooth, after which the lever 17 is drawn back to its holding position by means of a retracting spring 20 interposed between said lever and a fixed point on the machine frame.

Upon one end of the main driving shaft 5 there is fixedly mounted a crank wheel 21 in the form of a disk and to the wrist-pin 22 of said wheel is connected a pitman 23 which connects pivotally at its opposite end, as shown at 24, to a slide or runner 25 which reciprocates lengthwise in a grooved or slotted guide 26 secured to one side of the machine frame and rigidly supported and upheld thereby.

The slide or runner 25 is provided with upstanding bearing lugs 27 in which are journaled the end pintles or trunnions 28 of a file holder 29 comprising arms 30 arranged at a suitable distance apart and provided with means for holding and carrying a file shown at 31, the means shown consisting of loops 32 on the arms 30 in which the end portions of the file are held, and binding screws 33 for clamping the file in said loops. By the mechanism just described, the file is reciprocated back and forth, operating in one direction to file the teeth and in the return motion, passing out of engagement with the teeth by the means to be now described.

Secured to one side of the guide 26 and extending lengthwise thereof is a switch 34 having a longitudinal guideway 35 in which moves a switch-finger 36 connected rigidly with and extending laterally from the pivoted file-holder 29. In the active movement of the file-holder, the switch-finger 36 slides along the top edge of the switch-block 34, as shown in Fig. 4. Just before reaching the end of its throw, said finger comes in contact with a deflector lip 37 supported by means of an arm 38 and having an inclined working face which acts on the switch-finger 36 to depress the same and cause said finger to move downward into an enlarged end portion 39 of the runway 35, the latter being located a suitable distance below the top of the switch-block. In the reverse or inactive movement of the file holder, the finger 36 rides against an inclined shoulder 40 which further depresses the switch-finger, the latter thereafter traversing the horizontal depressed portion of the runway 35. Just as the finger 36 approaches the limit of its throw in the opposite direction, it comes in contact with a rising shoulder 41 at the opposite end of the runway 35 and is thereby elevated to a position in line with the top edge of the switch-block and in case said finger has not been fully elevated, upon the beginning of the next active or working stroke of the fileholder, said switch-finger comes in contact with another rising shoulder 42, which completes the lifting of the switch-finger and causes it to traverse the top surface of the switch-block as shown in Fig. 4. By the means described, during the operative stroke of the file holder, the file is carried across the saw-blade between adjoining teeth thereof so as to file and sharpen the same and in the return stroke the file is moved out of engagement with the saw blade.

The tooth setting mechanism embodies a pivoted saw set 43, the same being fulcrumed at 44 intermediate its ends on a suitable bracket 45 supported by the machine frame. This set is provided with a tooth-receiving notch 45 in which the teeth are received one by one, the shoulders formed by opposite sides of said notch serving to press and set the teeth alternately to opposite sides of the plane of the saw-blade. The opposite end of the saw set is provided in its opposite edges with notches 46, in connection with which the shoulders 47 of a pair of dogs 48 operate, the said dogs, as shown in Fig. 1, being pivotally connected at 49 to a jointed connecting bar 50, said connecting bar being operated by means of a gear wheel 51 mounted on a stud shaft 52 on the machine frame, said gear wheel 51 meshing with and being driven by a pinion 53 on the main driving shaft 5, as shown in Fig. 1. The wheel 51 carries a wrist-pin 54 to which the adjacent end of the connecting bar 50 is attached, the said bar 50 being jointed as shown at 55 to accommodate the orbital movement of the wrist-pin 54. As the bar 50 is reciprocated by the mechanism described, it causes the dogs 48 to act on the saw set and rock the same back and forth, thereby producing the setting action above described. Where less movement is required for the setting device, the dogs 48 may be rocked to one side, as indicated by dotted lines in Fig. 1 and allow a greater movement of the bar 50 without affecting the saw set 43, said bar 50 being provided for that purpose with a slot 56, the opposite ends of which come in contact with the opposite sides of the saw set during the reciprocation of the bar 50 and impart the requisite movement to the set. Where a greater movement of the saw set is desired, the dogs 48 are thrown into operation so as to engage said saw set in the manner above described.

The saw-feeding mechanism embodies a feed-lever 57, one end 58 of which is engaged by a cam projection 59 on the periphery of the wheel 21 which acts to rock said lever, while the opposite end of said lever is provided with a lip 60 which engages the teeth successively and moves the saw-blade upward with a step by step motion the distance of one tooth at a time, the operation of the feeder being timed to take place simultaneously with the operation of the saw-clamp, as it releases its hold or tension on the saw-blade.

From the foregoing description, it will be seen that the saw-clamp, the saw-feed, and the filing and setting devices are all operated from and controlled by the main driving shaft and properly timed to perform the functions for which they are adapted. The machine as a whole and the several parts thereof may be manufactured of any desired size to suit the saw-blades to be operated upon, and other conditions.

I claim:—

1. In a machine of the class described, the combination of a saw clamp, a stationary guide, a slidable plate in the guide movable back and forth with respect to the clamp, upwardly extending arms hingedly mounted on the slide to swing on an axis parallel to the movement of the latter, means for supporting a file on the arms, a laterally extending member attached to the arms to move therewith, a grooved plate arranged on the guide to receive the extremity of the said member for rocking the file holding arms, and means on the plate for guiding the member into one end of the groove and out of the other end.

2. In a machine of the class described, the combination of a saw clamp arranged to hold a saw in a vertical position, a horizontal guide, a slide movable in the guide, a file holder movable with and hinged on the top side of the slide to swing on an axis parallel to the movement of the latter, a switch device supported adjacent the slide, and a laterally extending member fixed on the file holder and coöperating with the switch device to rock the file holder by the reciprocation of the slide.

3. In a machine of the class described, the combination of a saw clamp, a slide, a guide therefor, a file holder hingedly mounted on the slide, a grooved plate supported on the guide at one side of the file holder, a finger on the file holder movable in and out of the groove of the plate for rocking the file holder by the reciprocation of the slide, and a deflector arranged on the plate for guiding the said member into the groove.

4. In a machine of the class described, the combination of a saw rest, a clamp coöperating therewith, saw stops on the rest, and a common means for hingedly mounting the clamp and securing the stops on the rest.

In testimony whereof, I affix my signature in presence of two witnesses.

SIDNEY E. ARNEY.

Witnesses:
CHARLEY A. CLAYTON,
CHARLES O. DE LAP.